United States Patent
Ben-Yehuda et al.

(10) Patent No.: US 11,442,658 B1
(45) Date of Patent: Sep. 13, 2022

(54) SYSTEM AND METHOD FOR SELECTING A WRITE UNIT SIZE FOR A BLOCK STORAGE DEVICE

(71) Applicant: Lightbits Labs Ltd., Kfar Saba (IL)

(72) Inventors: Shmuel Ben-Yehuda, Haifa (IL); Ofir Efrati, Even Yehuda (IL); Abel Alkon Gordon, Haifa (IL); Ofer Hayut, Rosh Pina (IL); Eran Kirzner, Moshav Elishama (IL); Alexander Shpiner, Nesher (IL); Roy Shterman, Kfar Saba (IL); Maor Vanmak, Magal (IL)

(73) Assignee: LIGHTBITS LABS LTD., Kfar Saba (IL)

( * ) Notice: Subject to any disclaimer, the term of this patent is extended or adjusted under 35 U.S.C. 154(b) by 0 days.

(21) Appl. No.: 17/333,208

(22) Filed: May 28, 2021

Related U.S. Application Data

(60) Provisional application No. 63/050,813, filed on Jul. 12, 2020.

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)
(58) Field of Classification Search
CPC .............................. G06F 3/0604; G06F 3/0679
See application file for complete search history.

(56) References Cited

U.S. PATENT DOCUMENTS

| | | | | |
|---|---|---|---|---|
| 2010/0318736 | A1* | 12/2010 | Balsu | G06F 11/3414 711/E12.001 |
| 2011/0088021 | A1* | 4/2011 | Kruglick | G06F 8/45 717/149 |
| 2014/0136763 | A1* | 5/2014 | Li | G11C 11/5642 711/103 |
| 2018/0275923 | A1* | 9/2018 | Earhart | G06F 3/0604 |

* cited by examiner

*Primary Examiner* — David Yi
*Assistant Examiner* — Nicholas A. Paperno
(74) *Attorney, Agent, or Firm* — Pearl Cohen Zedek Latzer Baratz LLP

(57) ABSTRACT computer-based system and method for selecting a write unit size for a block storage device, includes performing a plurality of sequences of I/O operations to the block storage device, each sequence having a write unit size from a plurality of write unit sizes; collecting performance metrics of the sequences of I/O operations; and selecting the write unit size for the block storage device from the plurality of write unit sizes based on the performance metrics. In some cases, preconditioning is performed prior to performing the plurality of sequences of I/O operations by emptying the block storage device; and writing data to the block storage device to fill the block storage device above a predetermined level.

17 Claims, 2 Drawing Sheets

SYSTEM AND METHOD FOR SELECTING A WRITE UNIT SIZE FOR A BLOCK STORAGE DEVICE

CROSS-REFERENCE TO RELATED APPLICATIONS

This application claims the benefit of provisional U.S. Patent Application No. 63/050,813, filed Jul. 12, 2020 and entitled: "SYSTEM AND METHOD FOR DETERMINING AN OPTIMAL WRITE UNIT SIZE FOR AN UNDERLYING STORAGE MEDIA", which is hereby incorporated by reference in its entirety.

FIELD OF THE INVENTION

The present invention relates generally to storage devices. More specifically, the present invention relates to determining a write unit size for non-volatile block storage device.

BACKGROUND

Block storage devices, also referred to herein as block storage media, storage devices, storage media or media, set the base for most current data storage services, such as cloud storage systems. Writing and reading from block storage devices is performed in blocks, e.g., data is written and read in blocks or chunks of fixed size. The common write unit size, also referred to as data unit size, used by applications and operating systems to access the storage media may typically be 4 KB (Kilobyte) or 512 B (Byte) for aligned I/O (e.g., read and write) operations.

Block storage devices may be implemented using multiple different technologies for example solid-state drive (SSD) with NAND flash-based storage. NAND flash storage technology has devolved to include ever increasing storage density levels with different amount of die layering and memory bits per cell. NAND flash storage technology may include for example single level cells (SLC) that allow storage of a single data bit per memory cell, multiple level cells (MLC) that allow storage of two data bits per each memory cell, triple level cells (TLC), quadruple level cells (QLC) and penta-level cells (PLC) that allow storage of three, four and five bits per memory cell respectively.

SUMMARY

According to embodiments of the invention, a system and method for selecting a write unit size for a block storage device may include performing a plurality of sequences of I/O operations to the block storage device, each sequence having a write unit size from a plurality of write unit sizes; collecting performance metrics of the sequences of I/O operations; and selecting the write unit size for the block storage device from the plurality of write unit sizes based on the performance metrics.

According to some embodiments, each sequence may have an alignment from a plurality of alignments, and embodiments of the method may include selecting the write unit size and an alignment for the block storage media from the plurality of alignments based on the performance metrics.

Embodiments of the method may include preconditioning the block storage device by emptying the block storage device; and writing data to the block storage device to fill the block storage device above a predetermined level.

According to embodiments of the invention, writing the data to the block storage device may include writing the data sequentially and/or randomly.

According to embodiments of the invention, the plurality of sequences of I/O operations may include a mixture of sequential write operations and random read operations.

According to embodiments of the invention, the plurality of sequences of I/O operations may include a mixture of random write operations and random read operations.

Embodiments of the method may include determining the plurality of sequences of I/O operations based on parameters of the block storage device.

Embodiments of the method may include applying a criterion for selecting the write unit size for the block storage device from the plurality of write unit sizes based on the performance metrics, wherein the criterion may include any combination of: a write amplification factor, maximum write bandwidth before the block storage device is saturated, maximum write bandwidth with average read latency below a predetermined latency, and maximum write bandwidth with a percentile of read operations below a predetermined latency.

According to embodiments of the invention, performing the plurality of sequences of I/O operations to the block storage device may include one of: performing a binary search for a maximal write unit size; and performing a linear search for a maximal write unit size.

Embodiments of the method may include writing to the block storage device using the selected write unit size.

According to embodiments of the invention, a system and method for selecting a data unit size for accessing a storage media may include: performing a plurality of series of write and read operations to the storage media, each series having a single data unit size over time that is different from the other series of write and read operations; measuring performance metrics of the series of write and read operations; and accessing the storage media using the data unit size having the best performance metrics.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
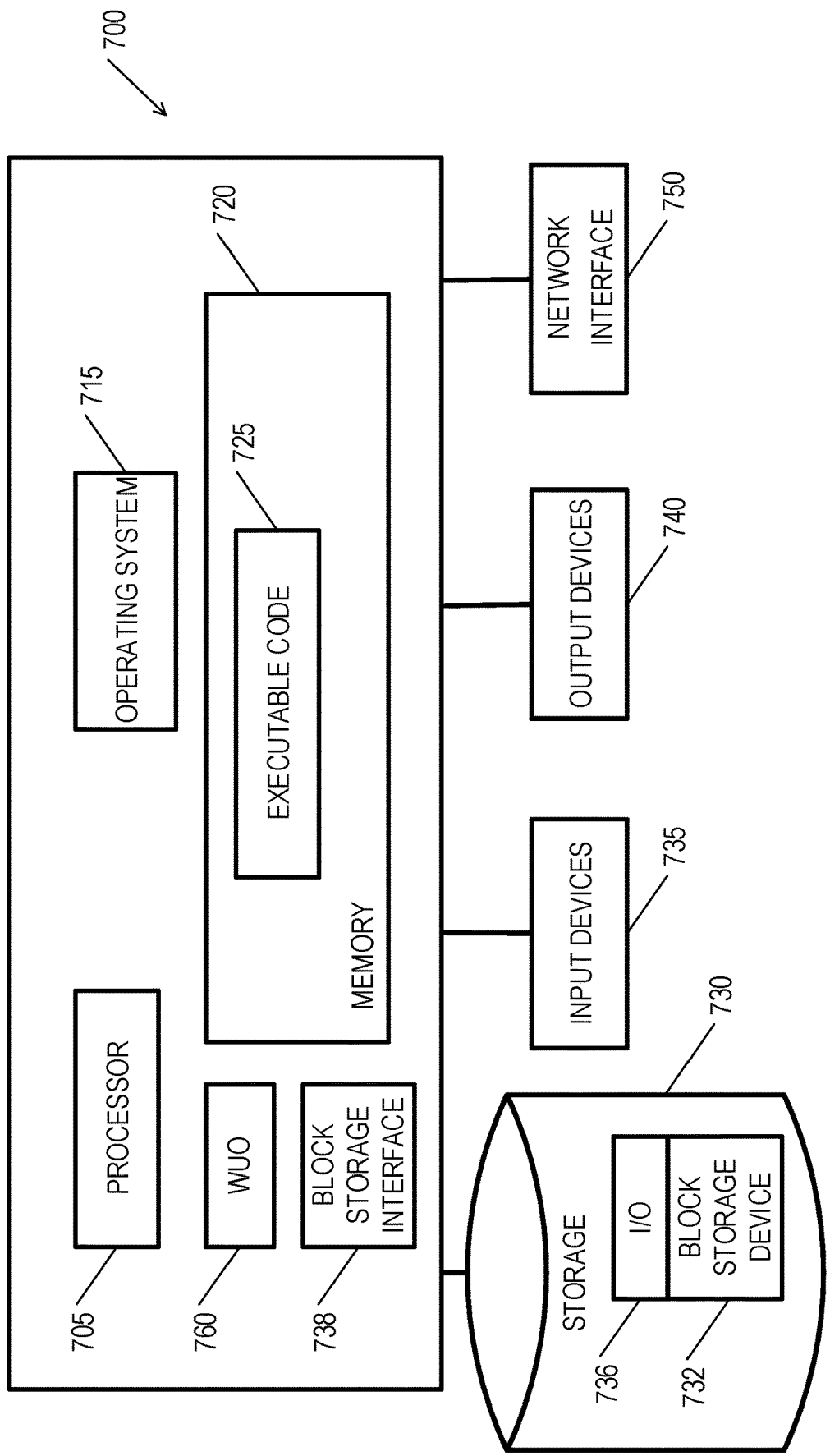
FIG. 1 illustrates an example computing device according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although some embodiments of the invention are not limited in this regard, discussions utilizing terms such as, for example, "processing," "computing," "calculating," "determining", "establishing", "analyzing", "checking", or the like, may refer to operation(s) and/or process(es) of a computer, a computing platform, a computing system, or other electronic computing device that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

As known in the art, block storage devices normally include a predefined portion of storage space that may be set aside for the purpose of facilitating background tasks, such as garbage collection (GC). This portion of storage space may be commonly referred to in the art as an over-provisioning (OVP) storage space. The internal implementation of OVP varies dramatically between different block storage types. The implementation diversity and complexity with denser (e.g., a higher number of data bits per memory cell) technologies may lead to different performance and behavior of block storage devices under different write unit sizes.

Thus, the write unit size, e.g., the size of a data block written in a single write operation to a block storage device, may significantly influence the performance of a block storage device. For example, the write unit size may affect the endurance of the block storage device as well as the overall performance of read operations. Specifically, the write unit size may affect the time required for the block storage device to process internally a read operation in the presence of read operations mixed with write operations.

According to some embodiments, the alignment of the write operations may affect the performance of block storage devices as well. Alignment may refer to an access step size. For example, write aligned to 4096 bytes means that the block storage device may be accessed in addresses that are a multiplication of 4096 bytes e.g., to address 0, 4096, 8192, etc. Typically, the optimal alignment is equal to the optimal write unit size. For example, writing in 1 megabytes (MB) write unit size may be optimal when aligned to 1 MB, e.g., when writing to address 0, 1 MB, 2 MB, etc. However, in some storage devices, the optimal write unit size may be different than the alignment step size. Therefore, in some embodiments of the invention, varying alignments may be tested per a single write unit size. Typically, smaller alignment sizes than the write unit size may be tested and possibly used. For example, for some storage devices, writing in 1 MB write unit size may be optimal when aligned to addresses that are a multiplication of 4096 bytes e.g., to address 0, 4096, 8192, etc.

For example, a specific SSD storage device may achieve optimal performance in terms of I/O operations per second (IOPS), read and write latencies, and read and write throughputs or bandwidth (e.g., the maximal amount of data written to or read from the storage device per unit time), when accessed by write operations sized and aligned to a specific write unit size, e.g., 16 kilobytes (KB). However, the same SSD, with write operations sized and aligned to 4 KB may exhibit a dramatic degradation of performance (e.g., degraded by as much as 75%-80%) and endurance.

Degraded performance in terms of read and write operations per second, read and write latencies, and read and write throughputs as a result of non-optimized write data unit size may not necessarily be observable initially. Typically, degradation may occur after stressing the block storage device for some time, e.g., after performing a certain amount of read and write operations. Applications are usually designed for a standard write unit size and may not be aware of characteristics of the specific block storage device. Thus, most applications may use the block storage device with non-optimal write unit size for the entire lifetime of the block storage device. The consequences of using non-optimal write unit size may include lower endurance of the block storage device, increased need to replace faulty block storage devices, and poor user experience due to degraded read and write performance.

Embodiments of the present invention may determine the optimal write unit size for improved endurance and performance of a specific block storage device used by a storage system. Embodiments of the invention may access the block storage device using the determined optimal write unit size and may thus provide an improvement in durability and performance of block storage devices over currently available technology. Therefore, embodiments of the invention may improve the technology of storage systems by providing better performance of the storage devices included in the storage systems.

Embodiments of the present invention may include a write unit optimization (WUO) module, that may automatically learn an optimal write unit size of a block storage device used by a storage system. The WUO module may subsequently adjust the write unit size used write the underlying block storage device (e.g., SSD, Flash, etc.) of the storage system.

The WUO module may be implemented as a hardware module, a software module or any combination thereof. For example, the WUO module may be implemented as a software process or task, and may be executed by at least one processor associated with the relevant one or more non-volatile storage devices.

FIG. 1 illustrates an example storage system, according to an embodiment of the invention. Storage system 700 may include a processor 705 that may be, for example, a central processing unit processor (CPU), a chip or any suitable computing or computational device, an operating system 715, a memory 720, a storage 730, input devices 735 and output devices 740. Processor 705 may be or include one or more processors, etc., co-located or distributed. Storage system 700 may be or may include for example a workstation or personal computer, or may be at least partially implemented by one or more remote servers (e.g., in the "cloud").

Operating system 715 may be or may include any code segment designed and/or configured to perform tasks involving coordination, scheduling, arbitration, supervising, controlling or otherwise managing operation of storage system 700, for example. Operating system 715 may be a commercial operating system. Operating system 715 may be or may include any code segment designed and/or configured to provide a virtual machine, e.g., an emulation of a computer system. Memory 720 may be or may include, for example, a random-access memory (RAM), a read only memory (ROM), a dynamic RAM (DRAM), a synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 720 may be or may include a plurality of possibly different memory units.

Executable code 725 may be any executable code, e.g., an application, a program, a process, task or script. Executable code 725 may be executed by processor 705 possibly under control of operating system 715. For example, executable code 725 may be or include software for managing storage 730, according to embodiments of the invention.

Storage 730 may be or may include, for example, a hard disk drive, a non-volatile memory, a flash memory, a floppy disk drive, a Compact Disk (CD) drive, a CD-Recordable (CD-R) drive, a universal serial bus (USB) device or other suitable removable and/or fixed storage unit. Storage 730 may include one or more types of non-volatile block storage devices 732. Block storage devices 732 may be or may include any storage or media type or technology used for block storage, including but not limited to, non-volatile memory express (NVMe), serial advanced technology attachment (SATA), SSD, NAND flash, SLC, TLC, QLC, MLC, PLC, hard disk drive (HDD), etc. Each of those media types, or even each implementation of the media type may have different characteristics such as OVP storage space, media endurance, GC policy and schedules, internal structure and organization and other characteristics that may affect, inter alia, the performance of block storage devices 732 under different write unit sizes.

In some embodiments, WUO module 760 (or other module of system 700) may monitor the performance of block storage devices 732, for example by collecting performance metrics as disclosed herein. In some embodiments of the invention, WUO module 760 may use proprietary or standard operating system tools to read internal data from block storage devices 732, including performance metrics such as device amplification and/or endurance parameters, etc. In some embodiments, WUO module 760 may initiate a test for determining a write unit size if the performance metrics, e.g., one or more of the performance metrics or a combination of the performance metrics such as weighted average, is below a threshold.

While drawn as a separate module, WUO module 760 and block storage interface 738 may be included in executable code 725 or be embedded in storage 730. In some embodiments, WUO module 760 may be executed as a part of the installation or initialization phase of storage 730. Additionally or alternatively, WUO module 760 may be executed periodically, or when a fault or degrades performance is detected in a block storage device 732.

WUO module 760 may select, determine or measure a write unit size per each block storage device 732. As known in the art, storage 730 may include a plurality of different storage device types, e.g., different types of block storage devices 732, where each type may require a different write unit size. According to some embodiments of the invention, different instance of the WUO module 760 may be used for different device types. Alternatively, the same WUO module 760 may be used to learn the write unit characteristics of each device type. According to some embodiments, storage system 700 may use the write unit size determined or selected by WUO module 760 for a block storage device 732 when writing to that block storage device 732. Thus, embodiments of the invention may improve the performance of block storage devices 732 used by storage system 700 by using an optimal write unit size per each block storage device 732.

In some embodiments of the invention, storage system 700 may handle degraded performance of a block storage device 732 over time, or malfunction in a block storage device 732. For example, WUO module 760 may calculate a new write unit size for a degraded or failing block storage device 732. Storage system 700 may use the new write unit size when accessing the degraded or failing block storage device 732, to accommodate the structure of the underlying block storage device 732. This may potentially bring a degraded or faulty block storage device 732 back to a satisfactory level of performance, or make block storage device 732 operational again even in case block storage device 732 has been identified as faulty.

According to some embodiments, WUO module 760 may determine or select a write unit size for an examined block storage device 732. For example, WUO module 760 may perform a plurality of sequences or series of I/O operations (each sequence typically including a single write unit size over time) to the examined block storage device 732. Each sequence of I/O operations may include write operations, read operations and any combinations thereof. Each sequence of I/O operations may include write and read operations with a write unit size that is different from other sequences of I/O operations. The write operations and/or read operations may be sequential and/or random. The sequences of I/O operations may include random writes, sequential writes, writes interspersed with a few reads, write interspersed with many reads, etc. Other combinations and sequences may be used.

WUO module 760 may use default sequences of I/O operations and/or sequences of I/O operations that are specific to a type or model of the examined block storage device 732 or to the system design and application. Thus, in some embodiments, WUO module 760 may determine the sequences of I/O operations used for testing the examined block storage device 732 based on parameters of the examined block storage device 732. According to one embodiment, the parameters of the block storage device used for determining the sequences of I/O operations may include the model, size, batch number, origin, etc. of block storage device 732. For example, WUO module 760 may detect, read or otherwise obtain the model of block storage device 732, e.g., by reading from a register of block storage device 732, and determine the tested write unit sizes based on known characteristics of that model, e.g., based on the specification of the model or type of block storage device 732 or other a-priori knowledge, or based on former tests performed on that model or type of block storage. For example, the specification of a specific type or model of block storage device may recommend a write unit size of minimum 16 KB. Thus, WUO module 760 may conclude that for that specific type or model of block storage device 732 there is no need to test write unit sizes smaller than 16 KB, and testing may be performed for write unit sizes of 16 KB and higher. Other parameters of the specific type or model of block storage device 732 may be considered when determining the tested write unit sizes, such as OVP storage space, media endurance, GC policy and schedules, internal structure and organization, etc.

WUO module 760 may perform a sequence of I/O operations that includes a mixture of sequential write operations and random read operations, or a mixture of random write operations and random read operations. In some embodiments, the sequence of I/O operations may depend on the application and the design of storage system 700, as some storage systems may mostly perform sequential write operations, while other may mostly perform random access write operations.

According to some embodiments, WUO module 760 may implement a search algorithm over write unit sizes, such as a binary-search, a bisection search or any other appropriate algorithm over the write unit size to find a write unit size. For example, WUO module 760 may perform a binary search or a linear search to find a write unit size.

For example, the sequences of I/O operations may include:
- Sequences of writing with a write unit sizes of 4 KB, 8 KB, 16 KB, 32 KB, 64 KB, 128 KB, 256 KB, 512 KB and 1 MB.
- A mixture of 50% reads and 50% sequential or random writes with a write unit sizes of 4 KB, 8 KB, 16 KB, 32 KB, 64 KB, 128 KB, 256 KB, 512 KB and 1 MB.
- A binary search on the write unit size, for example a first I/O sequence may be performed with a write unit size of 4 KB, a next I/O sequence may be performed with a write unit size of 8 KB, a next I/O sequence may be performed with a doubled write unit size and so forth, until the block storage device 732 is saturated. Once the block storage device 732 is saturated, a median write unit size between the write unit size that caused saturation and the last successful write unit size (e.g., the previous write unit size) may be selected for the next iteration, and the search may continue with steps of 4 KB, 8 KB, etc., until the largest successful write unit size is found with resolution of 4 KB.
- A linear search at a predetermined step size, for example starting from write unit size of 4 KB, 8 KB, 12 KB and stepping up in steps of 4 KB until 1 MB.

Additionally, or alternatively, WUO module 760 may use other mixture of write unit sizes and may use specific mixtures for specific block storage device 732 model, type, size, batch numbers, manufacture site, and any other parameter or metadata related to the examined block storage device 732. Possibly, each or some or the write unit sizes may be repeated with different alignments.

According to some embodiments, WUO module 760 may measure, obtain or collect performance metrics from the examined block storage device 732. For example, WUO module 760 may measure, obtain or collect performance metrics from the examined block storage device 732 following the sequences of I/O operations. The performance metrics may include, for example, write amplification, IOPS, read and write latencies, and read and write throughputs, etc. Thus, WUO module 760 may estimate the performance of the examined block storage device 732 following each sequence of I/O operations. For example, WUO module 760 may perform sequences of writing with a write unit size of 4 KB, 8 KB, 16 KB, 32 KB, 64 KB, 128 KB, 256 KB, 512 KB and 1 MB to the examined block storage device 732 and collect performance metrices following each sequence.

According to some embodiments, WUO module 760 may measure or calculate write amplification of block storage device 732 by reading (following an I/O sequence) from the block storage device 732 parameters such as the aggregated internal writes and the aggregated external (injected) writes and may calculate the write amplification as the ratio between the aggregated internal writes and the aggregated external writes. It is noted, that while the ideal write amplification is one, e.g., a single internal write for a single external write, in real life scenarios the write amplification is larger than one, and may be as large as 20-30. A smaller write amplification is better.

According to some embodiments, WUO module 760 may find, measure or calculate maximum write bandwidth of block storage device 732 for a given write unit size under various conditions. For example, WUO module 760 may find, measure or calculate maximum write bandwidth of block storage device 732 before the storage device is saturated, the maximum write bandwidth of block storage device 732 with average read latency below a predetermined latency, and maximum write bandwidth with a percentile (e.g., 99.99 percent) of read operations below a predetermined latency (also referred to as maximum write bandwidth at a read tail latency). According to some embodiments, WUO module 760 may find, measure or calculate maximum write bandwidth of block storage device 732 by performing several iterations with the same write unit size, but with different rates or writing, e.g., in terms of write operations per second (IOP). The maximum throughput or bandwidth possible for a specific write size before block storage device 732 gets saturated may be the maximum write bandwidth. For example, for a write unit size of 16 KB, a sequence of writing with 1KIOPs (1k writes per second× 16 KB write unit size) and then step up to for example 5KIOPs, 10KIOPs, 20KIOPs, etc. until block storage device 732 gets saturated. If, for example, block storage device 732 gets saturated at 20KIOPs, a sequence with for example 15KIOPs may be performed and then if block storage device 732 does not get saturated higher rates may be tried (at a desired resolution) until a maximum bandwidth before saturation is found. For example, if the maximum bandwidth before saturation is 17KIOPs then for 16 KB we the throughput equals 17K*16 KB, similar procedure may be followed for finding the maximum write bandwidth of block storage device 732 with average read latency below a predetermined latency, and maximum write bandwidth with a percentile (e.g., 99.99 percent) of read operations below a predetermined latency by adding read operations and measuring read latency for the different rates. According to some embodiments, the maximum write bandwidth may be normalized by the rated-manufacture-bandwidth, which is the maximum write bandwidth value provided by the manufacturer.

According to some embodiments, WUO module 760 may select or determine a write unit size for the examined block storage device 732 from the plurality of tested write unit sizes based on the performance metrics. For example, WUO module 760 may compare the performance metrices obtained for the 4 KB, 8 KB, 16 KB, 32 KB, 64 KB, 128 KB, 256 KB, 512 KB and 1 MB write unit size sequences, and select the smallest write unit size that provides the best performance.

According to some embodiments, WUO module 760 may select or determine a write unit size by applying a criterion on the performance metrics. The criterion may include any combination of endurance or write amplification factor (where the endurance may be the reciprocal of the write amplification factor), maximum write bandwidth before the storage device is saturated, maximum write bandwidth with average read latency below a predetermined latency, and maximum write bandwidth with a percentile (e.g., 99.99 percent) of read operations below a predetermined latency (also referred to as maximum write bandwidth at a read tail latency).

Write amplification is an undesirable phenomenon of some block storage technologies where, due to the internal design and processes of the block storage device 732, the amount of data that is physically written to the storage device is a multiple of the amount intended to be written. The write amplification factor is a measure of the write amplification. The write amplification factor may be used as a criterion. When a block storage device 732 becomes saturated, the block storage device 732 may no longer be able to commit (e.g., physically write) all incoming user writes in a timely manner, e.g., past the saturation point the user tries to write at a higher bandwidth than the block storage device 732 can receive and commit Thus, one criterion may be the maximum write bandwidth that the block storage device 732 is able of receiving and committing. Other criterions may be used.

For example, WUO module 760 may calculate a weighed combination of the following metrices:

50%*endurance+
10%*maximum write bandwidth/"rated-manufacture-bandwidth"+
20%*maximum write bandwidth with average read latency/"rated-manufacture-bandwidth"+
20%*maximum write bandwidth at a given limited read tail (99.99) latency/"rated-manufacture-bandwidth".

According to some embodiments, WUO module 760 may precondition the examined block storage device 732. Some block storage device 732 may not show degradation in performance as long as the load on the block storage device 732 is low. Therefore, performing sequences of I/O operations including write and read operations in different write unit sizes may not show any difference in performance for low loads on the block storage device 732. Accordingly, preconditioning may be required in order to stress the block storage device 732 and obtain noticeable, or near real-world performance, under the various read and write sequences.

According to some embodiments, preconditioning may include emptying or trimming the examined block storage device 732 and writing data to the examined block storage device 732 to fill the examined block storage device 732 above a predetermined level. Writing the data to the storage device may include writing the data sequentially and/or randomly. For example, WUO module 760 may precondition the examined block storage device 732 by writing 1 MB blocks sequentially, for the entire usable range of block storage device 732. Additionally or alternatively, WUO module 760 may perform preconditioning by writing 1 MB of data sequentially to the entire usable range of the examined block storage device 732 followed by a specific preconditioning flow based on the exact type or model of the examined block storage device 732, e.g., writing 4 KB of data randomly until each 4 KB-aligned address in the examined block storage device 732 has been written to at least once. Other sequences of preconditioning may be used.

According to some embodiments, storage system 700 may provide a block storage interface 738 to users and applications. Block storage interface 738 may mediate between the I/O interface the application and I/O interface 736 of block storage device 732. Storage system 700 may perform additional functions, such as write buffering, garbage collection, data tiering, prioritization and various features such as compression, encryption and data-redundancy and replication for data-loss protection. For example, block storage interface 738 may access block storage device 732 using the selected write unit size, e.g., the write unit size having the best performance metrics.

In some embodiments, some of the components shown in FIG. 1 may be omitted. For example, memory 720 may be a non-volatile memory having the storage capacity of storage 730. Accordingly, although shown as a separate component, storage 730 may include memory 720.

Input devices 735 may be or may include a mouse, a keyboard, a touch screen or pad or any suitable input device. It will be recognized that any suitable number of input devices may be operatively connected to computing device 700 as shown by block 735. Output devices 740 may include one or more displays, speakers and/or any other suitable output devices. It will be recognized that any suitable number of output devices may be operatively connected to computing device 700 as shown by block 740. Any applicable input/output (I/O) devices may be connected to computing device 700 as shown by blocks 735 and 740. For example, a wired or wireless network interface card (NIC), a modem, printer or facsimile machine, a universal serial bus (USB) device or external hard drive may be included in input devices 735 and/or output devices 740. Network interface 750 may enable device 700 to communicate with one or more other computers or networks. For example, network interface 750 may include a Wi-Fi or Bluetooth device or connection, a connection to an intranet or the internet, an antenna etc.

Embodiments described in this disclosure may include the use of a special purpose or general-purpose computer including various computer hardware or software modules, as discussed in greater detail below.

Embodiments within the scope of this disclosure also include computer-readable media, or non-transitory computer storage medium, for carrying or having computer-executable instructions or data structures stored thereon. The instructions when executed may cause the processor to carry out embodiments of the invention. Such computer-readable media, or computer storage medium, can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general-purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computer" may be any computing system as previously defined herein, or any module or combination of modulates running on a computing system.

Figure 2:
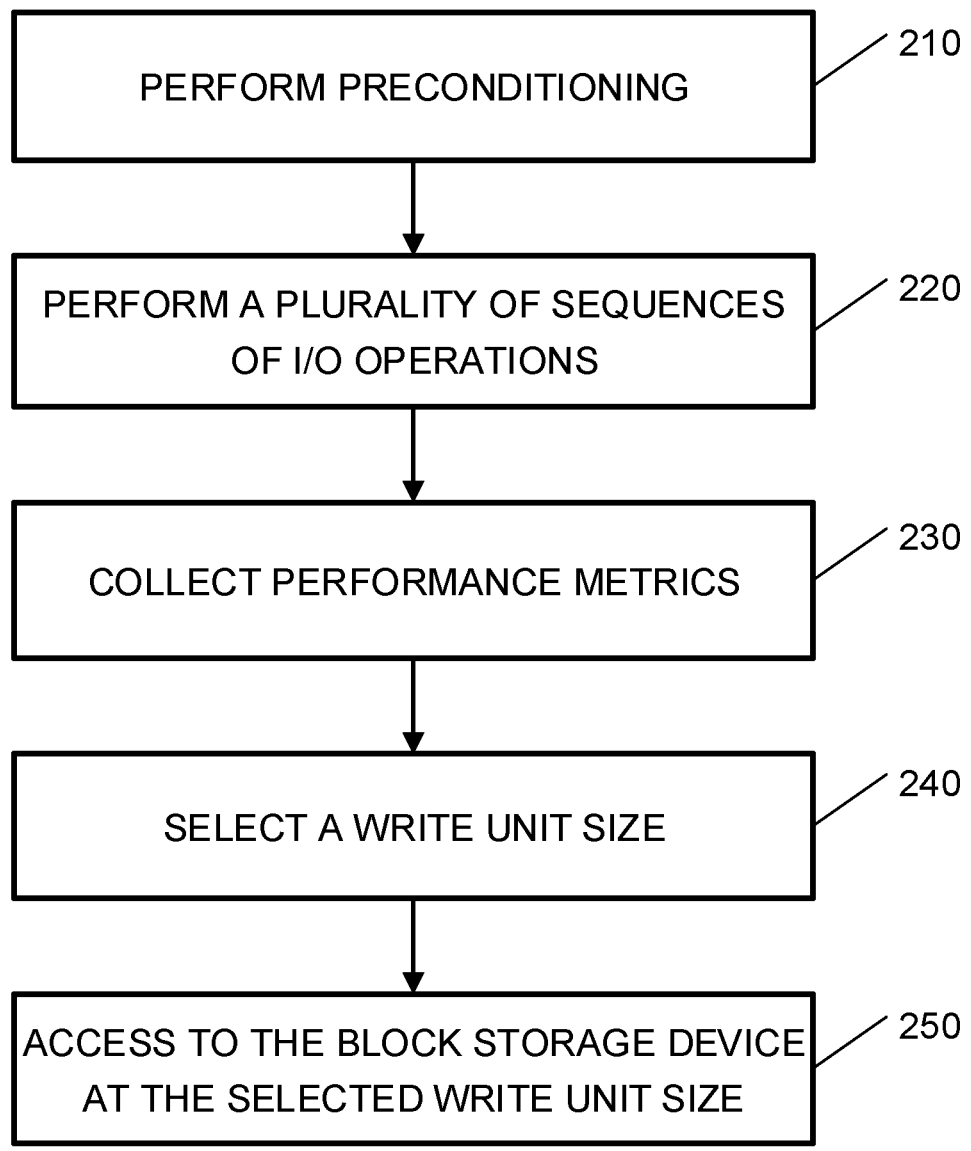
FIG. 2 is a flowchart of a method for selecting a write unit size for a block storage device, according to embodiments of the invention.

Reference is made to FIG. 2, which is a flowchart of a method for selecting a write unit size for a block storage device, according to embodiments of the invention. An embodiment of a method for selecting a write unit size for a block storage device may be performed, for example, by the system shown in FIG. 1.

In operation 210, the processor may perform preconditioning to the block storage device. For example, preconditioning may include emptying or trimming the storage device and writing data to the storage device to fill the storage device above a predetermined level, as disclosed herein. Writing the data to the storage device comprises writing the data sequentially and/or randomly. Preconditioning may be performed according to a standard preconditioning flow or according to a flow specific to block storage device type or model.

In operation 220, the processor may perform a plurality of sequences of I/O operations to the block storage device, each sequence having a different write unit size, as disclosed herein. For example, the plurality of sequences of I/O operations may include a mixture of sequential write operations and random read operations or a mixture of random write operations and random read operations. Other combinations may be used. The sequences of I/O operations may be common to a plurality of block storage device types or specific to block storage device types. According to some embodiments, performing a plurality of sequences of I/O operations to the storage device may include performing a binary search for a write unit size or performing a linear search for a write unit size.

According to some embodiments, the sequences of I/O operations may be determined or selected according to parameters of the block storage device, such as model, size, batch number, origin, etc. For example, embodiments of the invention may detect, read or otherwise obtain the model of the block storage device, e.g., by reading from a register of the block storage device, and determine the tested write unit sizes based on known characteristics of that model, e.g., based on the specification of the model or type of the block storage device or other a-priory knowledge, or based on former tests performed on that model or type of block storage. For example, the specification of a specific type or model of block storage device may recommend a write unit size of minimum 16 KB. Thus, it may be concluded that for that specific type or model of block storage device there is no need to test write unit sizes smaller than 16 KB, and testing may be performed for write unit sizes of 16 KB and higher. Other parameters of the specific type or model of the block storage device may be considered when determining the tested write unit sizes, such as OVP storage space, media endurance, GC policy and schedules, internal structure and organization, etc.

In operation 230, the processor may collect performance metrics of the sequences of I/O operations as disclosed herein.

In operation 240, the processor may select the write unit size for the storage device from the plurality of write unit sizes based on the performance metrics. For example, selecting the write unit size may include applying a criterion on the performance metrics. The criterion may include selecting the write unit size that resulted in the maximum of any combination (e.g., a weighted combination) of one or more of the following performance metrices:

a write amplification factor,
maximum write bandwidth before the storage device is saturated,
maximum write bandwidth with average read latency below a predetermined latency, and
maximum write bandwidth with a percentile of read operations below a predetermined latency.

In operation 250, the processor may write to the block storage device using the selected write unit size.

For the processes and/or methods disclosed, the functions performed in the processes and methods may be implemented in differing order as may be indicated by context. Furthermore, the outlined steps and operations are only provided as examples, and some of the steps and operations may be optional, combined into fewer steps and operations, or expanded into additional steps and operations.

The present disclosure is not to be limited in terms of the particular embodiments described in this application, which are intended as illustrations of various aspects. Many modifications and variations can be made without departing from its scope. Functionally equivalent methods and apparatuses within the scope of the disclosure, in addition to those enumerated, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used in this disclosure is for the purpose of describing particular embodiments only, and is not intended to be limiting.

This disclosure may sometimes illustrate different components contained within, or connected with, different other components. Such depicted architectures are merely exemplary, and many other architectures can be implemented which achieve the same or similar functionality.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

The invention claimed is:

1. A method for selecting a write unit size for a block storage device, the method comprising:
   preconditioning the block storage device by:
      emptying the block storage device; and
      writing data to the block storage device to fill the block storage device above a predetermined level;
   performing a plurality of sequences of I/O operations to the block storage device, each sequence having a write unit size from a plurality of write unit sizes;

collecting performance metrics of the sequences of I/O operations; and selecting the write unit size for the block storage device from the plurality of write unit sizes based on the performance metrics.

2. The method of claim 1, wherein writing the data to the block storage device comprises writing the data sequentially and/or randomly.

3. The method of claim 1, wherein the plurality of sequences of I/O operations comprise a mixture of sequential write operations and random read operations.

4. The method of claim 1, wherein the plurality of sequences of I/O operations comprise a mixture of random write operations and random read operations.

5. The method of claim 1, comprising determining the plurality of sequences of I/O operations based on parameters of the block storage device.

6. The method of claim 1, comprising applying a criterion for selecting the write unit size for the block storage device from the plurality of write unit sizes based on the performance metrics, wherein the criterion comprises any combination of:
- a write amplification factor,
- maximum write bandwidth before the block storage device is saturated,
- maximum write bandwidth with average read latency below a predetermined latency, and
- maximum write bandwidth with a percentile of read operations below a predetermined latency.

7. The method of claim 1, wherein performing the plurality of sequences of I/O operations to the block storage device comprises one of:
- performing a binary search for a maximal write unit size; and
- performing a linear search for a maximal write unit size.

8. The method of claim 1, comprising writing to the block storage device using the selected write unit size.

9. A method for selecting a data unit size for accessing a storage media, the method comprising:
- preconditioning the block storage device by:
  - emptying the block storage device; and
  - writing data to the block storage device to fill the block storage device above a predetermined level;
- performing a plurality of series of write and read operations to the storage media, each series having a single data unit size over time that is different from the other series of write and read operations;
- measuring performance metrics of the series of write and read operations; and
- accessing the storage media using the data unit size having the best performance metrics.

10. A system for monitoring of movement of data in a computer network, the system comprising:
- a memory; and
- a processor configured to:
  - perform preconditioning the block storage device by:
    - emptying the block storage device; and
    - writing data to the block storage device to fill the block storage device above a predetermined level;
  - perform a plurality of sequences of I/O operations to the block storage device, each sequence having a write unit size from a plurality of write unit sizes;
  - collect performance metrics of the sequences of I/O operations; and
  - select the write unit size for the block storage device from the plurality of write unit sizes based on the performance metrics.

11. The system of claim 10, wherein the processor is configured to write the data to the block storage device by writing the data sequentially and/or randomly.

12. The system of claim 10, wherein the plurality of sequences of I/O operations comprise a mixture of sequential write operations and random read operations.

13. The system of claim 10, wherein the plurality of sequences of I/O operations comprise a mixture of random write operations and random read operations.

14. The system of claim 10, wherein the processor is configured to determine the plurality of sequences of I/O operations based on parameters of the block storage device.

15. The system of claim 10, wherein the processor is configured to apply a criterion for selecting the write unit size for the block storage device from the plurality of write unit sizes based on the performance metrics, wherein the criterion comprises any combination of:
- a write amplification factor,
- maximum write bandwidth before the block storage device is saturated,
- maximum write bandwidth with average read latency below a predetermined latency, and
- maximum write bandwidth with a percentile of read operations below a predetermined latency.

16. The system of claim 10, wherein the processor is configured to perform the plurality of sequences of I/O operations to the block storage device by performing one of:
- performing a binary search for a maximal write unit size; and
- performing a linear search for a maximal write unit size.

17. The system of claim 10, wherein the processor is configured to write to the block storage device using the selected write unit size.

* * * * *